United States Patent
Al Abdulhadi et al.

(10) Patent No.: US 10,693,906 B2
(45) Date of Patent: Jun. 23, 2020

(54) PROVIDING SECURE DATA TRANSFER BETWEEN NETWORKS

(71) Applicant: Saudi Arabian Oil Company, Dhahran (SA)

(72) Inventors: Abdulmajeed Ahmad Al Abdulhadi, Dhahran (SA); Saleem Eidah Al Harthi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 95 days.

(21) Appl. No.: 15/274,461

(22) Filed: Sep. 23, 2016

(65) Prior Publication Data
US 2017/0093884 A1 Mar. 30, 2017

Related U.S. Application Data

(60) Provisional application No. 62/232,257, filed on Sep. 24, 2015.

(51) Int. Cl.
*H04L 29/06* (2006.01)
*H04L 29/08* (2006.01)

(52) U.S. Cl.
CPC ........ *H04L 63/145* (2013.01); *H04L 63/0428* (2013.01); *H04L 63/162* (2013.01);
(Continued)

(58) Field of Classification Search
CPC ....... H04L 69/321; H04L 69/08; H04L 69/32; H04L 63/145; H04L 63/0428; H04L 63/162; H04L 63/0245
(Continued)

(56) References Cited

U.S. PATENT DOCUMENTS

| 6,032,203 A | * | 2/2000 | Heidhues | ................ H04L 69/08 709/230 |
| 7,873,348 B2 | | 1/2011 | Grimminger et al. | |

(Continued)

FOREIGN PATENT DOCUMENTS

| EP | 1113623 A2 | 7/2001 |
| JP | 2005210556 A | 8/2005 |

(Continued)

OTHER PUBLICATIONS

International Search Report arid Written Opinion issued in International Application No. PCT/US2016/053396 dated Dec. 6, 2016.
(Continued)

*Primary Examiner* — Jahangir Kabir
(74) *Attorney, Agent, or Firm* — Fish & Richardson P.C.

(57) ABSTRACT

A data frame transmitted over a serial link between a destination network and a source network is received by a computer-implemented system in the destination network. The data frame is compatible with a data link layer protocol and includes a data field. The computer-implemented system in the destination network converts the data frame directly into a format compatible with an application layer protocol, where converting the data frame into the format comprises interpreting received information included in the data field as numerical values rather than executable code. The computer-implemented system in the destination network outputs the numerical values to an application in the destination network.

17 Claims, 11 Drawing Sheets

(52) U.S. Cl.
CPC .............. *H04L 69/08* (2013.01); *H04L 69/32* (2013.01); *H04L 69/321* (2013.01); *H04L 63/0245* (2013.01)

(58) Field of Classification Search
USPC .............................................. 726/12–14, 22
See application file for complete search history.

(56) References Cited

U.S. PATENT DOCUMENTS

| | | | |
|---|---|---|---|
| 8,595,790 B2 | 11/2013 | Chang et al. | |
| 8,646,065 B2 | 2/2014 | Oberle et al. | |
| 2003/0163577 A1 | 8/2003 | Moon et al. | |
| 2004/0249960 A1 | 12/2004 | Hardy et al. | |
| 2006/0095174 A1 | 5/2006 | Sonnenrein et al. | |
| 2008/0312851 A1* | 12/2008 | Kagan | G01D 4/002 702/60 |
| 2009/0287866 A1* | 11/2009 | Mejias | H04L 12/2816 710/110 |
| 2009/0307552 A1 | 12/2009 | Harada et al. | |
| 2011/0022187 A1* | 1/2011 | Felts | G05B 19/4186 700/9 |
| 2012/0026900 A1* | 2/2012 | Chandrasekaran | H04L 41/0672 370/252 |
| 2012/0278562 A1* | 11/2012 | Cook | G06F 12/0623 711/154 |
| 2013/0142093 A1 | 6/2013 | Miklos et al. | |
| 2013/0232218 A2* | 9/2013 | Bell | H04W 76/00 709/217 |
| 2014/0096241 A1 | 4/2014 | Li et al. | |
| 2014/0165182 A1* | 6/2014 | Curry | H04L 63/0209 726/12 |
| 2015/0063167 A1 | 3/2015 | Yoo et al. | |
| 2015/0156286 A1* | 6/2015 | Blair | H04L 12/4625 709/201 |

FOREIGN PATENT DOCUMENTS

| | | |
|---|---|---|
| KR | 101434596 | 8/2014 |
| WO | WO2004/040860 A1 | 5/2004 |

OTHER PUBLICATIONS

Raghavendra et al., "Application Layer Security Issues and Its Solutions," International Journal of Computer Science Engineering & Technology, vol. 2, No. 6, Jun. 2012, pp. 1266-1269, <URL:ijcset.net/docs/Volumes/volume2issue6/ijcset2012020605.pdf>.

Gulf Cooperation Council Examination Report issued in GCC Application No. GC 2016-32070 dated Feb. 26, 2019, 4 pages.

\* cited by examiner

| COM # | # Points | Scan Frequency (Sec) |
|---|---|---|
| COM04 | 10,000 ▽▲ | 10 |
| COM05 | 10,000 ▽▲ | 10 |
| COM06 | 10,000 ▽▲ | 10 |
| COM07 | 1,000 ▽▲ | 1 |
| COM08 | 1,000 ▽▲ | 1 |
| COM09 | 1,000 ▽▲ | 1 |
| COM10 | 1,000 ▽▲ | 1 |
| COM11 | 1,000 ▽▲ | 1 |
| COM12 | 4,000 ▽▲ | 5 |
| COM13 | 4,000 ▽▲ | 5 |

FIG. 9

PROVIDING SECURE DATA TRANSFER BETWEEN NETWORKS

TECHNICAL FIELD

This disclosure relates to information technology, particularly in cyber security.

BACKGROUND

Cyber-security is a major concern for companies. Industrial Distributed Control Systems (DCS) and Supervisory Control and Data Acquisition (SCADA) used to be completely isolated; therefore their security could be controlled and safeguarded. Additionally, the information from these industrial systems used to be limited to monitoring and control information. As industrial systems can be used to form a plant network, these systems have evolved and historization functionality (the storage and generation of historical data) has been added as an integral part to further support industrial operations. This historical data can be used to analyze failures and project future operational trends.

With more diverse operations, management has also became interested in the information provided by the industrial systems. Accordingly, the industrial systems have evolved to be connected to business networks. For example, connectivity demands such as access to plant data at the business network, access to business data at the plant network, plant-to-plant data exchange, etc. have arisen. With these connectivity demands, cyber-security has become a major issue as companies seek to secure their control systems.

Current mechanisms for providing secured connectivity try to propagate data from one network to another without propagating malicious code or leaving any room for hackers to access and misuse the connectivity tunnel (or "data tube"). However, challenges exist in distinguishing the required data to be passed from one network to another and possible injected threats present in this required data, which may appear on the other side of a data propagation as malware or malicious code. When malicious code is not recognized, the malicious code can be mistakenly considered as part of required data. Subsequently, the malicious code can be reconstructed through each layer of an Open Systems Interconnection (OSI) model at a destination network (for example, data link layer (Layer 2) up to application layer (Layer 7). As such, the malicious code can eventually propagate through the destination network and become active. Malicious actions performed by the malicious code can cause damage to the destination network and data, negatively affect destination network performance, and potentially use the destination network as a platform to duplicate and further propagate the malicious code to other networks.

SUMMARY

This disclosure relates to providing secure data transfer between networks.

In general, a data frame transmitted over a serial link between a destination network and a source network is received by a computer-implemented system in the destination network. The data frame is compatible with a data link layer protocol and includes a data field. The computer-implemented system in the destination network converts the data frame directly into a format compatible with an application layer protocol, where converting the data frame into the format comprises interpreting received information included in the data field as numerical values rather than executable code. The computer-implemented system in the destination network outputs the numerical values to an application in the destination network.

Innovative aspects of the described subject matter can be implemented as a computer-implemented method, in non-transitory, computer-readable media, or in a computer-implemented system. For example, one computer-implemented method includes receiving, by a computer-implemented system in a destination network, a data frame transmitted over a serial link between the destination network and a source network, the data frame compatible with a data link layer protocol, the data frame including a data field; converting, by the computer-implemented system in the destination network, the data frame directly into a format compatible with an application layer protocol, wherein converting the data frame into the format comprises interpreting received information included in the data field as numerical values rather than executable code; and outputting, by the computer-implemented system in the destination network, the numerical values to an application in the destination network.

Other implementations of this aspect include a corresponding computer-implemented system and a non-transitory, computer-readable medium storing computer-readable instructions executable by a computer, each configured to perform the actions of the above-described computer-implemented method. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

For example, a system comprising a source network; a destination network; and a serial link between the destination network and the source network. The source network comprises a first computer-implemented system configured to transmit a data frame over the serial link between the destination network and the source network. The destination network comprises a second computer-implemented system configured to receive the data frame over the serial link between the destination network and the source network; convert the data frame directly into a format compatible with an application layer protocol, wherein converting the data frame into the format comprises interpreting received information included in the data field as numerical values rather than executable code; and output the numerical values to an application in the destination network.

The foregoing and other implementations can each optionally include one or more of the following features, alone or in combination:

A first aspect, combinable with the general implementation, further comprising transmitting, by the computer-implemented system in the destination network, a data request to the source network; and wherein the data frame is received only in response to the data request;

A second aspect, combinable with the general implementation, wherein the destination network comprises a plant network and the source network comprises a business network.

A third aspect, combinable with the general implementation, wherein the data link layer protocol comprises a data link layer protocol of MODBUS protocol.

A fourth aspect, combinable with the general implementation, wherein the serial link between the destination network and the source network is physically secured or encrypted.

A fifth aspect, combinable with the general implementation, further comprising: receiving multiple data frames transmitted over the serial link between the destination network and the source network; and converting each of the multiple data frames independently and directly into a format compatible with the application layer protocol.

A sixth aspect, combinable with the general implementation, wherein outputting the numerical values to an application in the destination network comprises outputting the numerical values to an application in the destination network based on an open platform communications (OPC) protocol.

The example techniques can achieve a number of advantages. For example, the example techniques can improve the network layout and allow the design to be practical. The example techniques introduce the use of terminal servers to increase the scalability and make the network more secure and reliable. The example techniques can provide a cost effective and easy-to-implement solution to protect the destination network. For example, the example techniques can be implemented as ready-made software packages that are generic to various systems and not software application specific. Few customizations, if any, are required.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description in the following. Other features and advantages of the disclosure will be apparent from the description and drawings, and from the claims.

BRIEF DESCRIPTION OF THE DRAWINGS

FIG. 9 is a table illustrating example simulation results of the example techniques for providing secure data transfer between networks, according to an implementation.

Like reference numbers and designations in the various drawings indicate like elements.

DETAILED DESCRIPTION

Figure 1:
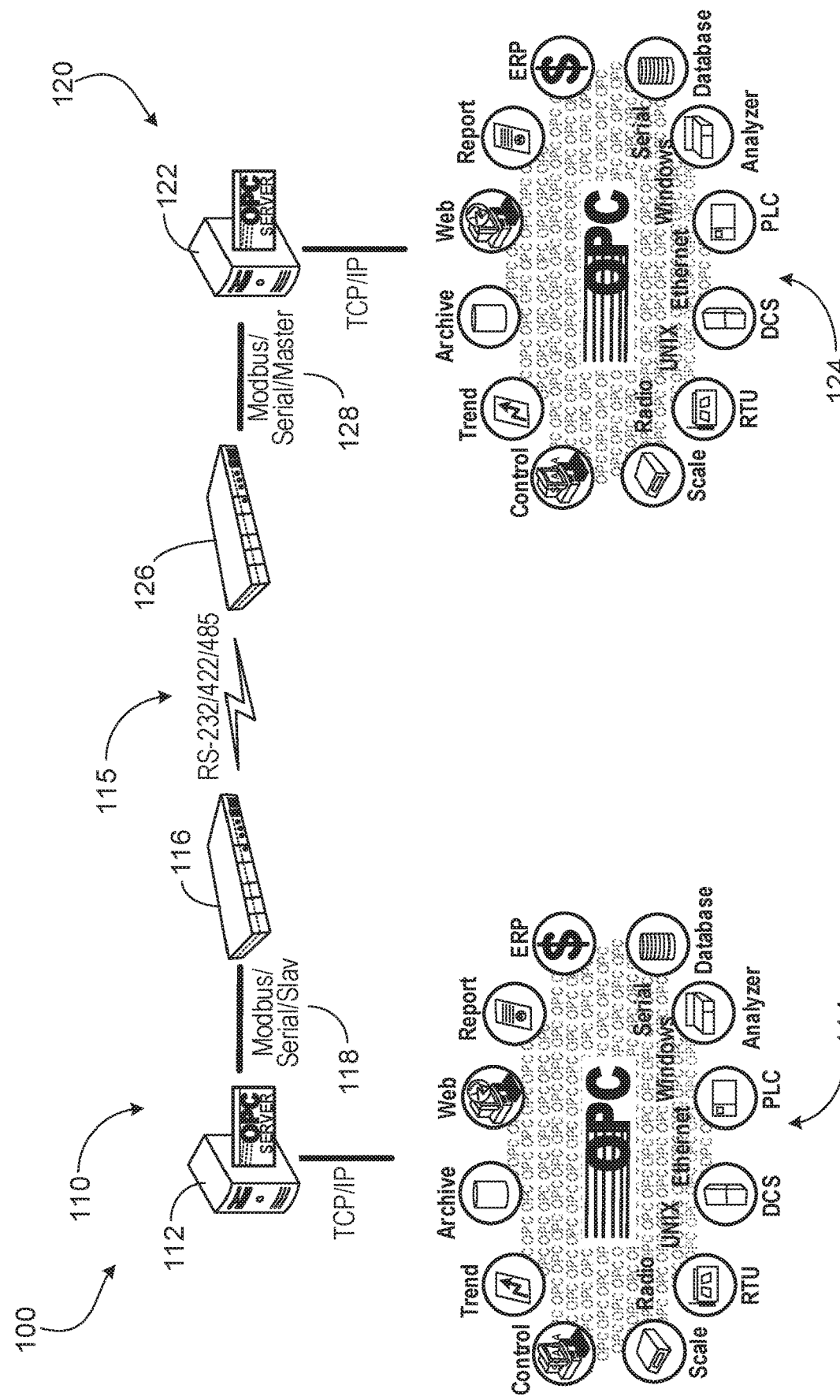
FIG. 1 is a diagram showing an example system for providing secure data transfer between networks with full guard to a destination (protected) network from being infected by a virus or compromised by malware or malicious code, according to an implementation.

This disclosure describes computer-implemented methods, software, and systems for providing secure data transfer between networks.

The example techniques described in this disclosure can establish a connectivity tunnel (or "data tube"), for example, to provide a secure bi-directional data transfer between a business network and a plant network. The data tube is a logical tube to pass the data from a source to a destination (for example, from one network to another). In some implementations, the data tube passes only the desired data between two different networks but does not allow information such as malicious code (including viruses, malware, or other type of malicious code) to propagate from one network to another. Moreover, the example techniques can assure that, in case there is a malicious code that manages to propagate through the data tube, the malicious code will not be reconstructed at the destination network to form a threat. As such, the described example techniques protect the destination network from being infected by malicious code and preventing hackers from penetrating the destination network systems. Therefore, the data tube can assist with the protection of the destination network and systems.

In some implementations, unlike existing mechanisms that rely on protocols (for example, Layer 7 protocols of the OSI model) capable of carrying data as well as executable code, the example techniques move data exchange (transfer) to a protocol (for example, the data link layer (Layer 2) protocols of the OSI model) that is capable of carrying data but not executable code. For instance, the example techniques strip out intermediate layers that are capable of propagating malicious code, and uses Layer 2 protocols as a data carrier from one network to another. The example techniques terminate the inter-network communication at Layer 2 to stop propagation of malicious code (that is, data transfer will end at Layer 2). As such, example techniques prohibit malicious code from propagating from a business network to a plant network and vice-versa. The example techniques do not allow malicious code to be reconstructed at the destination network. Instead, gateways can be used to bridge the data smoothly and directly between Layer 7 protocols and Layer 2 protocols. For example, each single network frame can be de-encapsulated immediately when it is received without having to collect many successive frames to build files or code. As such, malicious code is prevented from construction and activation to perform undesired or destructive operations. The described techniques assist in enhancing network safety of destination networks.

The example techniques can provide one or more advantages. First, the described techniques can be used to facilitate data exchange between two networks safely. Second, the described techniques can also overcome the vulnerability of current implementations and can be a robust defense to breaches that may compromise the safety and integrity of a target network. Third, the described techniques can provide protection to a target or destination network from breaches regardless of what happens on a source network. Fourth, the described techniques can be easily added and integrated into an existing software suite, device, or system to form a complete solution for secure connectivity and data transfer between networks. For example, analog and digital values can be transferred between the two networks smoothly and reliably in seconds with a full guard of the target network. In some implementations, the example techniques can integrate all components in an appliance. Fifth, the described techniques can provide original equipment manufacturer (OEM) licensing of the software implementing the secure data tube and encrypt the exchanged data to assure the integrity of the delivered data.

FIG. 1 is a diagram showing an example system 100 for providing secure data transfer between networks, according to an implementation. The example system can include a source network 110 and a target or destination network 120. Each of the source network 110 or the destination network 120 can include one or more of a plant network, a business network, or another type of network. In some implementations, the source network 110 can be an unprotected network (for example, a business network) while the target or destination network 120 can be a protected network (for example, a plant network), for example, protected by a serial link 115 between the source network 110 and the destination network 120.

In some implementations, the source network 110 or the destination network 120 can each include or be communicatively coupled to an open platform communications (OPC) server 112 or 122 and a terminal server 116 or 126, respectively. The OPC servers 112 and 122 can communicate with other data sources 114 and 124, respectively. In some implementations, the OPC server can act as a gateway to carry the data received from standard protocols up to Layer 7 of the OSI model to a data-based protocol (for example, MODBUS) up to Layer 2 of the OSI model to transfer only the data but not executable code.

The OPC servers 112 and 122 can place the data to the terminal server 116 and 126 over, for example, Transmission Control Protocol/Internet Protocol (TCP/IP) in serial format 118 and 128, respectively. One terminal server (for example, Cisco® 2610XM) can receive the data and pass it to another terminal server over a serial link 115. In some implementations, the serial link 115 acts as a bridge between the source network 110 (for example, a business network) and the destination network 120 (for example, a plant network), and it is the only hard wiring required to connect the two networks 110 and 120. In some implementations, the serial link 115 can be an RS-232, RS-422, RS-485, or other serial communication links.

In some implementations, the OPC server 112 in the source network 110 can function as a slave station while the OPC server 122 in the destination network 120 can function as a master station. As an example, the terminal server 126 in the destination network 120 (for example, a plant network) can receive data from the terminal server 116 in the source network 110 (for example, the business network). The terminal server 126 can deliver the data to the master station, the OPC server 122, in the plant network 120. The master station 122 can receive the data as data sent from the slave station (for example, the OPC server 112 in the source network 110) responding to requests initiated from the master station 122 at the plant network 120. In typical implementations, the MODBUS driver implementation used by the master station (for example, the OPC server 122 in destination network 120) is certified as "unconditionally compliant" with MODBUS (for example, over at least serial line specification V1.02.)

Figure 2:
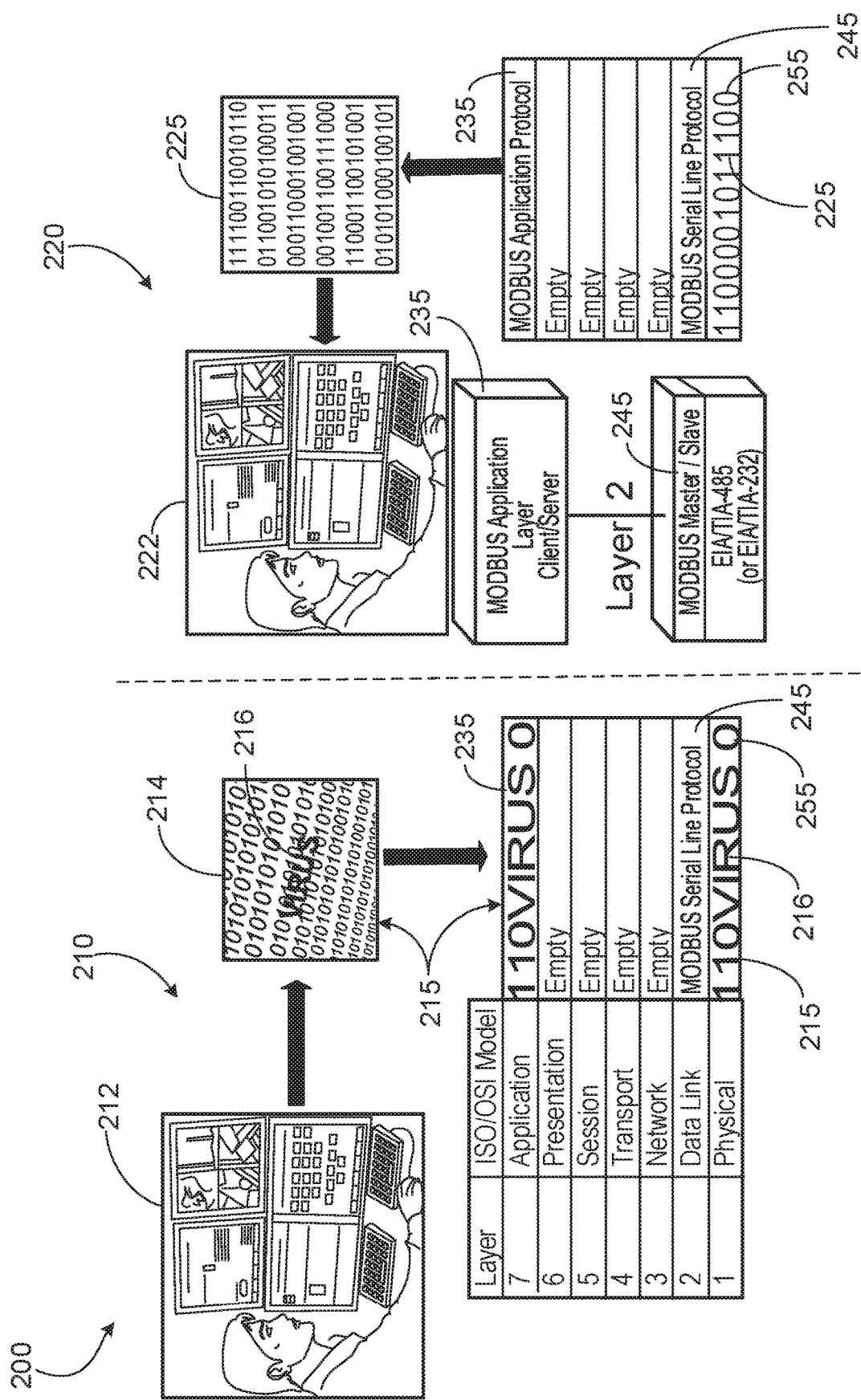
FIG. 2 is a diagram showing an example process for transferring data from one network to another through the Open Systems Interconnection (OSI) model 7 Layers using MODBUS Serial Line Protocol, according to an implementation.

FIG. 2 is a diagram showing another example system 200 for providing secure data transfer between networks based on MODBUS protocols, according to an implementation. The example system 200 includes a source or transmitting side 210 and a destination or receiving side 220. The source side 210 can represent a source network (for example, the source network 110) while the destination side 220 can represent a destination network (for example, the destination network 120). A computer-implemented system 212 at the source side 210 can generate and transmit data 215 to a computer-implemented system 222 at the destination side 220. Consistent with a prior statement associated with FIG. 1, in typical implementations, the MODBUS driver implementation used by the computer-implemented system in the destination side 220 is certified as "unconditionally compliant" with MODBUS (for example, over at least serial line specification V1.02).

In some implementations, the computer-implemented systems 212 and 222 can each include an OPC server or gateway. In some implementations, an OPC simulator can be used to generate, for example, a thousand random values 214 to populate the OPC/MODBUS gateway variables. The OPC/MODBUS gateway variable values 214 can function as data 215 to be transmitted between networks. In some implementations, viruses or other types of malicious code 216 can be included in the data 215. On the source side 210, the OPC server can pass the data 215 to a terminal server (not illustrated) to transmit it over a serial link to another terminal server (not illustrated) on the destination side 220.

In some implementations, rather than the typical communication systems implementing the full 7-layer OSI model protocols, a data-based protocol, such as the MODBUS protocol, that is based on up to Level 2 communication protocols, can be used to transmit data over a serial link to the destination side 220 for providing secure data transfer between networks.

For example, the MODBUS protocol includes a MODBUS application layer 235, a MODBUS serial link protocol layer 245 (for example, with MODBUS master or slave protocol), and a physical layer 255 (for example, EIA/TIA-485 or EIA/TIA-232) that corresponds to the application layer (Layer 7), data link layer (Layer 2), and physical layer (Layer 1) of the OSI model. The MODBUS protocol does not include network layer (Layer 3), transport layer (Layer 4), session layer (Layer 5), or presentation layer (Layer 6) of the OSI model.

The communication can be completely based on physical layer (Layer 1) and the data link layer (Layer 2) of the OSI model. At these two layers, no malicious code can be formed to propagate from one network to another, especially when it has been controlled at the same layer level on the other side of the network after reconstruction of the received data.

The data can be directly delivered from Layer 7 to Layer 2, and reconstructed back directly from Layer 2 to Layer 7. By doing so, Layer 3 to Layer 6 is completely excluded/bypasssed from data handling to stop the propagation of malicious code.

For instance, as illustrated in FIG. 2, on the source side 210, the data 215 (for example, variable values 214 and included virus 216) can be passed from the MODBUS application layer 235 (Layer 7) to the MODBUS serial link protocol layer 245 (Layer 2). In some implementations, the data 215 can be encapsulated into one or more data frames (for example, data frames as described in FIGS. 3 and 4) according to the MODBUS serial link protocol layer 245, be placed on the physical layer 255 (Layer 1), and transmitted over a serial link from the source side 210 to the destination side 220.

On the destination side 220, the computer-implemented system receives the data 225 from the physical layer 255. The received data 225 can be reconstructed and decoded by the MODBUS serial link protocol layer 245 as pure data rather than executive code. As stated above, in typical implementations, the MODBUS driver implementation used by the destination side 220 is certified as "unconditionally compliant" with MODBUS (for example, over at least serial line specification V1.02). The decoded data can be directly passed to the MODBUS application protocol layer 235.

Figure 3:
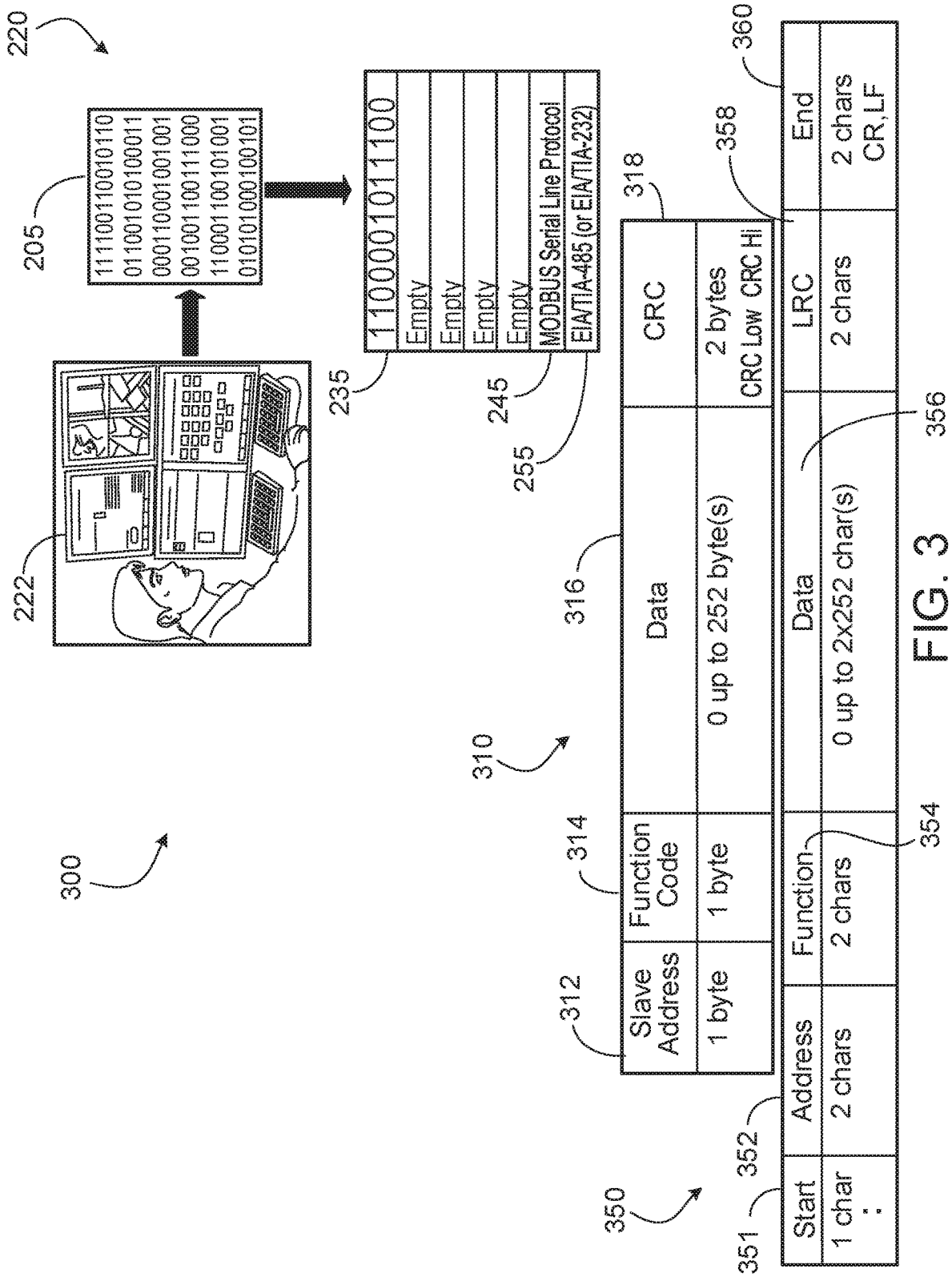
FIG. 3 is a diagram showing example frames transmitted by a computer-implemented system in a destination (protected) network to request (query) data from a source (unprotected) network, according to an implementation.

FIG. 3 is a diagram 300 showing example frames 310 and 350 transmitted by the computer-implemented system (master) 222 on the destination (protected) network side 220 for placing a data request (query) 205 to a source computer-implemented system (slave) in the source (unprotected) network (for example, the computer-implemented system 212 at the source side 210), according to an implementation. The example frames 310 and 350 are compatible with the MODBUS serial link protocol layer 245 for transmission over a serial link. The example frame 310 is a MODBUS remote terminal unit (RTU) mode frame. The example frame 310 includes a slave address field 312, a function code field 314, a data field 316, and a CRC field 318. The data field 316 can include up to 252 bytes of data. The example frame 350 is a MODBUS ASCII mode frame, includes a start field 351 (colon), an address field 352, a function field 354, a data field 356, a Longitudinal Redundancy Check (LRC) field 358, and an end field 360 Carriage Return-Line Feed (CRLF). The data field 356 can include up to 2*252 characters ("char"). The field description and functionality can be found in MODBUS specifications (http://www.modbus.org/docs/Modbus_over_serial_line_V1_02.pdf; see also functions list and application protocol specification: http://www.modbus.org/docs/Modbus_Application_Protocol_V1_1b3.pdf), which are incorporated by reference in their entirety.

Figure 4:
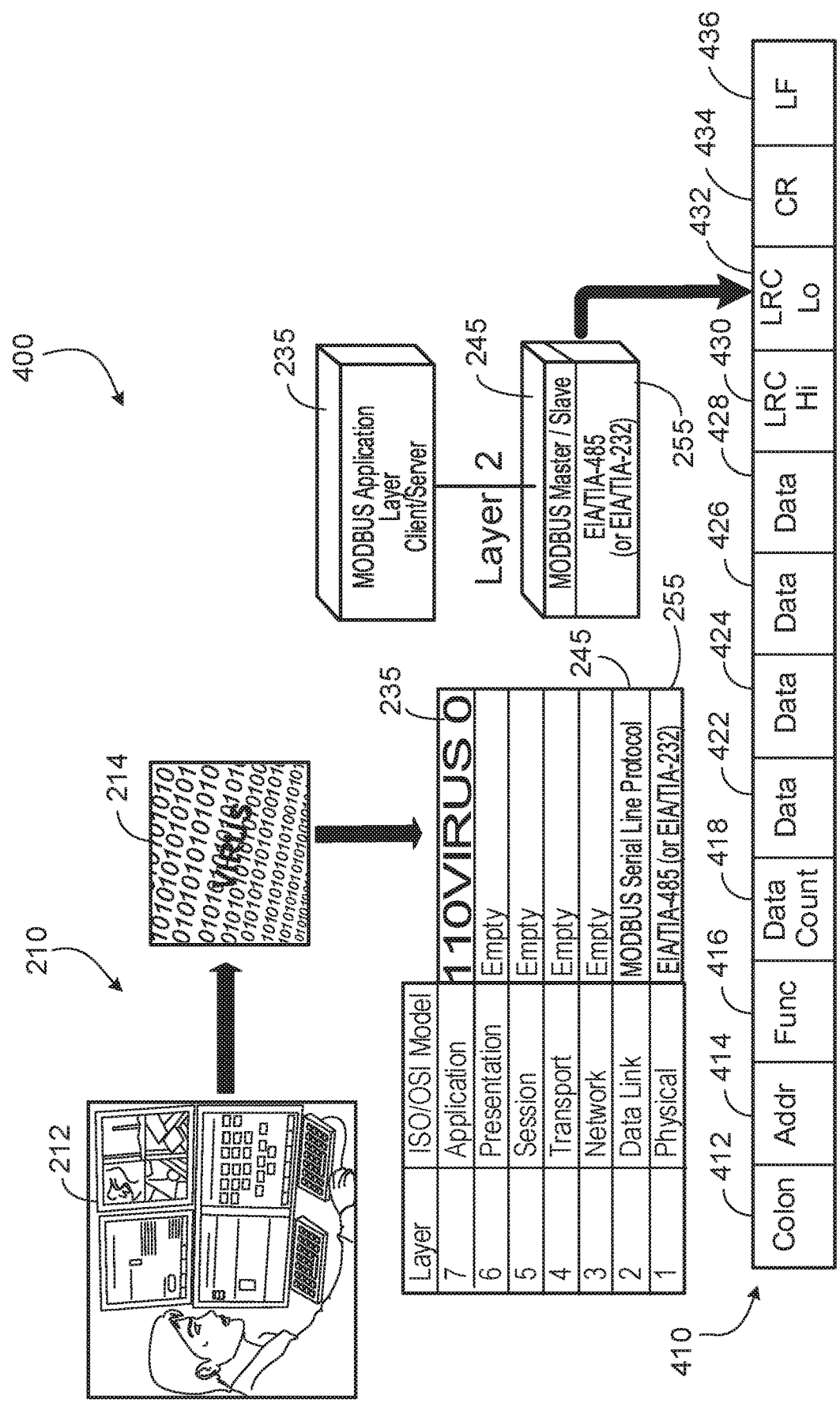
FIG. 4 is a diagram showing an example frame transmitted by a computer-implemented system in a source (unprotected) network providing data in response to a data request (query) received from a computer-implemented system in a destination (protected) network, according to an implementation.

FIG. 4 is a diagram 400 showing another example frame 410 transmitted by the computer-implemented system (slave) 212 on the source side 210 for providing secure data transfer between networks, according to an implementation. The example frame 410 is compatible with the MODBUS serial link protocol layer 245 for transmission over a serial link. The example frame 410 is a MODBUS ASCII mode frame, includes a start field (colon) 412, an address field 414, a function code field 416, a data count field 418, four data fields 422, 424, 426, and 428, a Longitudinal Redundancy Check (LRC) high field 430, a LRC low field 432, a CR field 434, and an LF field 436. The four data fields 422, 424, 426, and 428 can have the same or different lengths. In other implementations, a data frame can have other structures.

The data fields 422, 424, 426, and 428 can include, for example, one or more parameters, measurement values (for example, temperature, pressure, etc.), product attributes, or other properties or conditions of a plant network.

Figure 5:
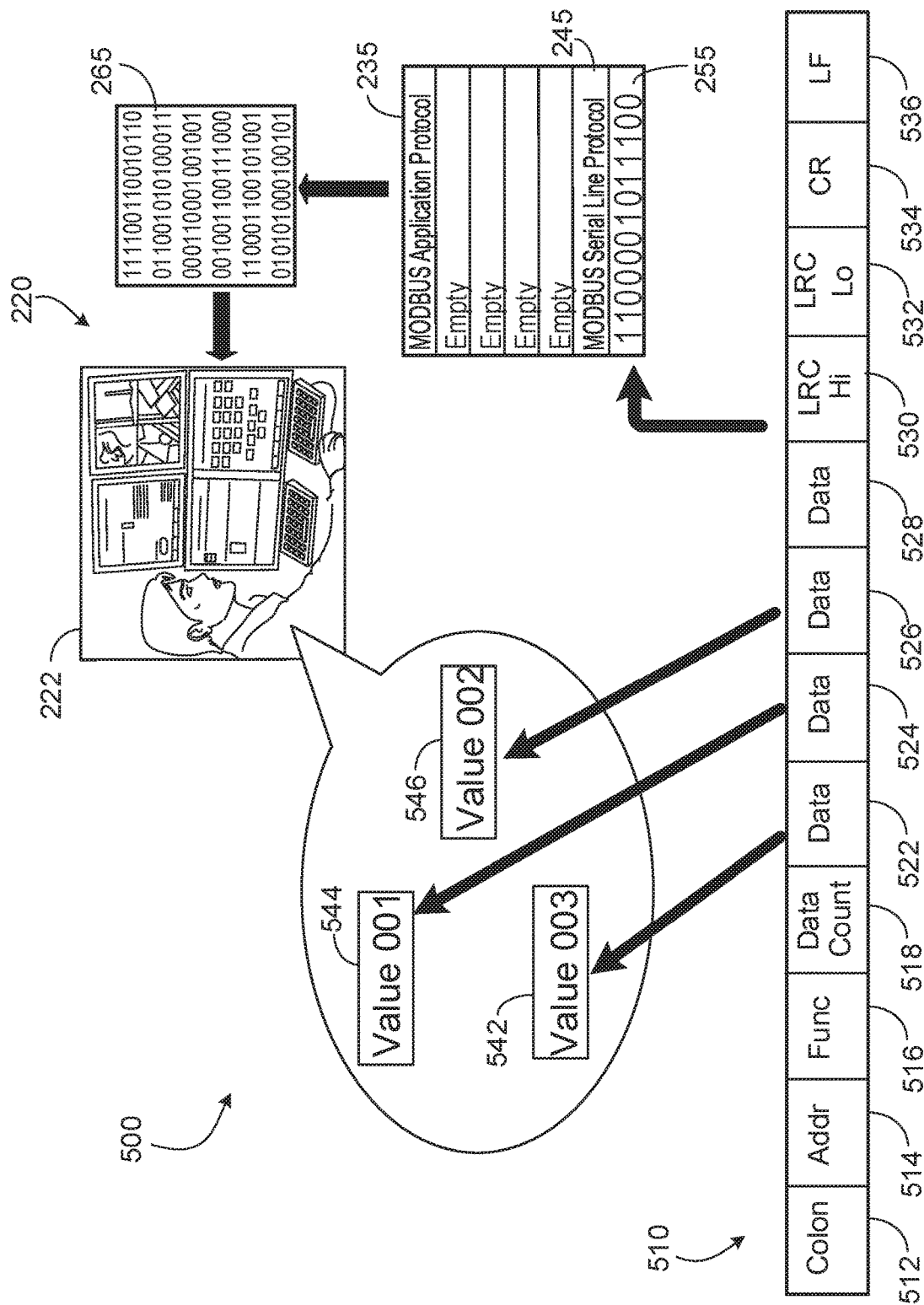
FIG. 5 is a diagram showing an example frame received by a computer-implemented system in a destination (protected) network, according to an implementation.

FIG. 5 is a diagram 500 showing an example frame 510 received by the computer-implemented system (master) 222 on the destination side 220, according to an implementation. The example frame 510 is the received frame in the destination (protected) network corresponding to the example frame 410 transmitted from the source (unprotected) network in FIG. 4. The frame 510 includes values 512, 514, 516, 518, 522, 524, 526, 528, 530, 532, 534, and 536, corresponding to the colon field 412, address field 414, function code field 416, data count field 418, four data fields 422, 424, 426, and 428, LRC high field 430, LRC low field 432, CR field 434, and LF field 436, respectively.

As an example, the values 522, 524, and 526 in the data fields 422, 424, and 426 can be decoded as value 003 542, value 001 544, and value 002 546, respectively. In some implementations, even if a malicious code is included in the received data fields 422, 424, and 426, the received data values 522, 524, and 526 are decoded as pure data, rather than executable code, so that any malicious code will not be executed and pose a threat to the destination network 220.

In some implementations, the information to be transmitted to the destination network (for example, random values 214) may exceed the size of a single frame. The information can be segmented and encapsulated into multiple frames. In some implementations, each of the multiple frames can be independently handled by the destination network. No buffering is performed or needed to wait for and assemble all the frames on the receiving side. In some implementations, malicious code may be segmented into different frames for transmission but not assembled together upon reception. The segmented malicious code is rendered inert and cannot execute to generate undesirable or malicious effects.

Figure 6:
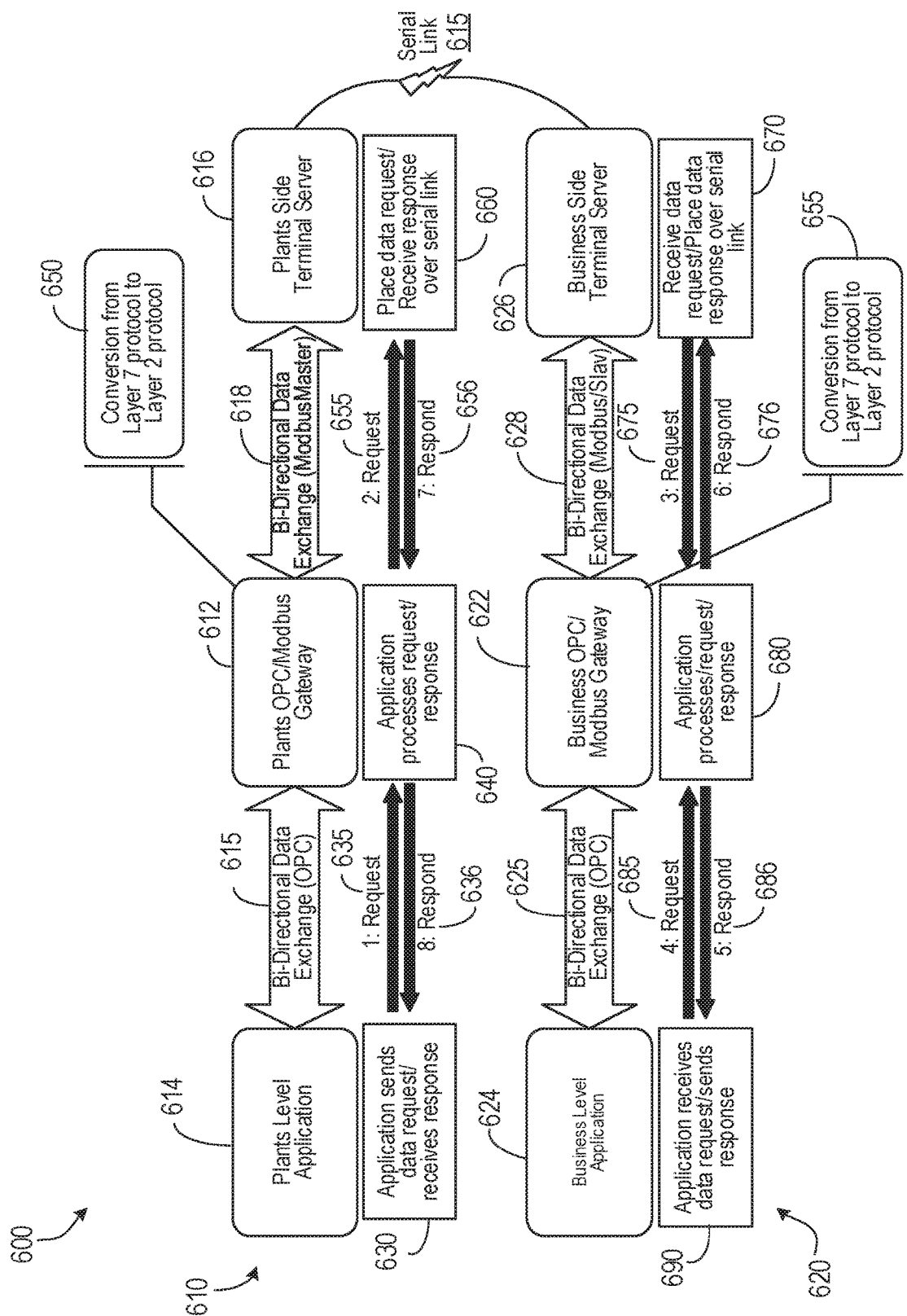
FIG. 6 is a data flow diagram illustrating an example process for providing secure data transfer between networks, according to an implementation.

FIG. 6 is a data flow diagram illustrating an example method 600 for providing secure data transfer between networks, according to an implementation. In some implementations, the MODBUS protocol is used to carry only the required data from one end to the other end securely. For example, the data will be transferred from a business network 620 to a plant network 610 and vice versa over serial communication 615 (point-to-point communication). The data is received and delivered at Layer 7 on both ends of the business' and the plant's network to facilitate the communication with other applications and systems (for example, other applications and systems 114 or 124). The data is communicated over Layer 2 to immunize that data from any malicious code.

In some implementations, the master and slave configuration can be used to enhance the security of the data transfer between the two networks. In this way, the master station issues a request explicitly, whereas the slave station has no control to issue and request to send data, which implies that all requests are outbound requests.

As illustrated in FIG. 6, the plant network 610 is connected to the business network 620 with a serial communication link 615. The plant network 610 includes a plant-level application 614 (for example, one or more applications 124) executed on a computer-implemented system (not illustrated) that includes or is communicably coupled to a plant OPC/MODBUS gateway 612 (for example, the OPC/MODBUS server 122) through a bi-directional data exchange link 615 (for example, based on the OPC protocols). The plant OPC/MODBUS gateway 612 is communicably coupled to a plant-side terminal server 616 over a bi-directional data exchange link 618 (for example, based on the MODBUS protocols).

The plant-side terminal server 616 is further connected with a business-side terminal server 626 in the business network 620 through the serial communication link 615. The business-side terminal server 626 is communicably coupled to a business OPC/MODBUS gateway 622 (for example, the OPC/MODBUS server 112) over a bi-directional data exchange link 628 (for example, based on the MODBUS protocols). The business OPC/MODBUS gateway 622 is included or communicably coupled to a computer-implemented system (not illustrated) that executes a business-level application 624, for example, through a bi-directional data exchange link 625 (for example, based on the OPC protocols).

In some implementations, the plant OPC/MODBUS gateway 612 can be configured as a master station while the business OPC/MODBUS gateway 622 can be configured as a slave station. In this configuration, the plant OPC/MODBUS gateway 612 can control that data traffic and maintain the security of the data messaging so all requests are outbound requests sent to the business network 620. Consistent with prior statements associated with FIGS. 1 and 2, in typical implementations, the MODBUS driver implementation used by the master station (for example, the plant OPC/MODBUS gateway 612) is certified as "unconditionally compliant" with MODBUS (for example, over at least serial line specification V1.02).

At 630, a data request is initiated or generated by the plant-level application 614 executed on the computer-implemented system in the plant network 610. For example, the data request can be formatted according to a Layer 7 protocol. From 630, method 600 proceeds to 635.

At 635, the data request is sent to the plant OPC/MODBUS gateway 612. From 635, method 600 proceeds to 640.

At 640, the request is processed, for example, by an application associated with the plant OPC/MODBUS gateway 612. The plant OPC/MODBUS gateway 612 can continuously issue requests over the bi-directional data exchange link 618 to provide the data used to respond to the request received from plant-level application 614. The plant OPC/MODBUS gateway 612 can carry on the translation between OPC protocol format and MODBUS protocol. From 640, method 600 proceeds to 650.

At 650, the data request is converted from a Layer 7 protocol to a Layer 2 protocol. For example, the conversion of the data request can include encapsulating the data request (for example, in a Layer 7 format) in a MODBUS frame such as frame 310 or 350. From 650, method 600 proceeds to 655.

At 655, the converted data request (for example, as one or more Layer 2 data frames such as the MODBUS frame 310 or 350) is passed to the plant-side terminal server 616 over the bi-directional data exchange link 618. From 655, method 600 proceeds to 660.

At 660, the data request can be placed by the plant-side terminal server 616 on the physical layer to transmit over the serial communication link 615. From 660, method 600 proceeds to 670.

At 670, the business-side terminal server 626 in the business network 620 can receive the data request transmitted over the serial communication link 615. From 670, method 600 proceeds to 675.

At 675, the data request is passed by the business-side terminal server 626 to the business OPC/MODBUS gateway 622. From 675, method 600 proceeds to 680.

At 680, the business OPC/MODBUS gateway 622 can process the data request by converting the data request in one or more Layer 2 data frames into a format compatible with a Layer 7 protocol. For example, the conversion of the data request can include de-capsulating the data request in the MODBUS frame 310 or 350 into a format compatible with a business application layer protocol. From 680, method 600 proceeds to 685.

At 685, the business OPC/MODBUS gateway 622 can deliver the converted data request to the business-level application 624. From 685, method 600 proceeds to 690.

At 690, the business-level application 624 receives and decodes the data request. The business-level application 624 can then retrieve, collect, or otherwise obtain data (for example, numerical values) to respond to the data request. The retrieved data can be included in a response formatted according to a Layer 7 format. From 690, method 600 proceeds to 686.

At 686, the response (for example, in the Layer 7 format) is passed to the business OPC/MODBUS gateway 622. The business OPC/MODBUS gateway 622 can process the response, for example, by converting the response from Layer 7 protocol to Layer 2 protocol. The conversion can be similar to the conversion of the data request at 650. For example, the response can be encapsulated in a data frame (for example, data frame 310, 350, or 410) compatible with a data link layer protocol (for example, MODBUS serial link layer protocol 245). The data frame includes one or more data fields (for example, data field 315, 356, 422, 424, 426) that include information (for example, numerical values) in response to the request. From 686, method 600 proceeds to 676.

At 676, the converted response (for example, in the format of data frame compatible with a data link layer protocol) is sent to the business-side terminal server 626. The business-side terminal server 626 can place the response on the physical layer to be transmitted back to the plant network 610 using the serial communication link 615. From 676, method 600 proceeds to 656.

At 656, the plant-side terminal server 616 receives the response on the physical layer from the serial communication link 615, and delivers the response to the plant OPC/MODBUS gateway 612. The plant OPC/MODBUS gateway 612 can process the response, for example, by converting the response from a Layer 2 protocol to a Layer 7 protocol. In some implementations, converting the response can include converting the response in the data frame that is compatible with the data link layer protocol (for example, MODBUS serial link layer protocol 245) directly into a format that is compatible with an application layer protocol (for example, MODBUS application protocol). For example, the conversion can include de-capsulation of the response data in the data frame and interpreting received information included in the data field as pure data (for example, numerical values) rather than executable code. The plant OPC/MODBUS gateway 612 can interpret or decode the received response without any intention to reconstruct it as software or other executable code. For example, the protocol driver of the plant OPC/MODBUS gateway 612 can handle the received Layer 2 protocol MODBUS frame, such as the frame 510, to decode the data and hand the decoded data to Layer 7 protocol so that the OPC/MODBUS gateway 612 avail the data over OPC protocol to plant-level application 614. In some implementations, the plant OPC/MODBUS gateway 612 can handle one or more received Layer 2 protocol MODBUS frames frame by frame. Each received frame can be converted independently without buffering or assembling all the frames together. From 656, method 600 proceeds to 636.

At 636, the plant OPC/MODBUS gateway 612 can make the interpreted or decoded response data available for the plant-level application 614. In some implementations, other applications (for example, applications 124) in the plant network 610 can access the data safely from the plant OPC/MODBUS gateway 612. As stated above, in typical implementations, the plant OPC/MODBUS gateway 612 MODBUS driver implementation verifies the incoming responses as certified "unconditionally compliant" with MODBUS (for example, over at least serial line specification V1.02) in order to validate the response with respect to function code, frame length, addresses fields, and quantity of inputs, and to validate received inputs. By requiring certification of specified unconditional compliance, any frame spoofing attempts can be detected and handled as a bad response. After 636, method 600 stops.

In some implementations, the business-level application 624 can initiate a data request seeking data response from the plant-level application 614. For example, the business OPC/MODBUS gateway 622 can be configured as the master station while the plant OPC/MODBUS gateway 622 can be configured as the slave station. A reverse process of the above-described data flow can be implemented for providing secure data transfer from the business network 620 to the plant network 610.

In some implementations, the example techniques can assure the security of the destination network (for example, the plant network 610) because the MODBUS protocol is not capable of carrying executable code or interpreting the received data as software or other executable code. The integrity of the exchanged data depends on the integrity of the data received at the destination network from the OPC/MODBUS gateway. For example, vulnerability of the OPC/MODBUS gateway at a source network (for example, the business network 620) can be as good as vulnerability of the data sources (for example, applications 114).

As the MODBUS protocol was not originally designed with security in mind, the use of this protocol in an exposed network may not be secure and may open security holes in some instances. To enhance the security of the data tube or data transfer based on the MODBUS protocol, physical security is required over the equipment and the serial link to assure the integrity of the data itself. For example, the connectivity between the OPC server (for example, the OPC server 112 or 122) and the terminal server (for example, the terminal server 116 or 126) needs to be physically secured or encrypted, for example, by using secured or encrypted wireline communication links rather than wireless communications. In some implementations, the connectivity between terminal servers of the business network 620 and the plant network 610 needs to be physically secured or encrypted. In some implementations, the data that is exchanged between the two networks is limited to numerical values (for example, analog, digital, integer, floating point, or other types of numerical data). The connectivity between the two networks is limited to Layer 2 of the OSI model to assist with immunity of the exchanged data and the plant's network 610. As such, a data transfer based on the MODBUS protocol can be secure to guard against physical interventions of the data traffic such as sniffer operations or injection of malicious network packets.

Figure 7:
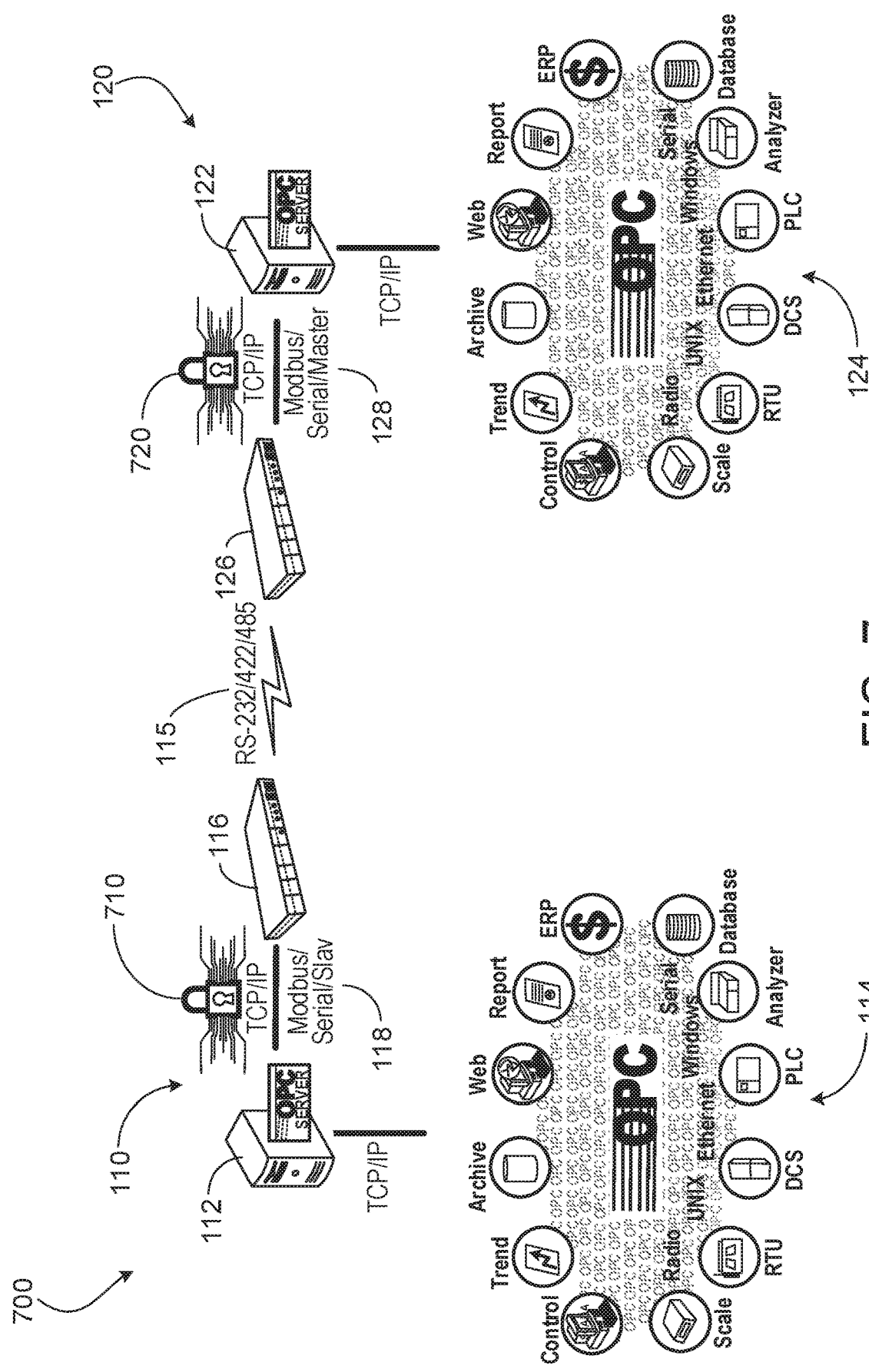
FIG. 7 is a diagram showing an example system for providing secure data transfer between networks with enhanced security between open platform communications (OPC) servers and terminal servers, according to an implementation.

FIG. 7 is a diagram showing an example system 700 for providing secure data transfer between networks with enhanced security between OPC servers and terminal servers, according to an implementation. Compared to the example system 100 in FIG. 1, the example system 700 includes encrypted secured communication link 118 between the OPC server 112 and the terminal server 116, and encrypted secured communication link 128 between the OPC server 122 and the terminal server 126. For example, the communication links 118 and 128 can be secured connections that require the data to be encrypted or otherwise physically protected to guarantee the integrity of data transmitted over them.

In some implementations, more than one serial communication link (for example, the communication links 115) can be used between the terminal server 116 and terminal server 126, for example, depending on the amount of data to be exchanged and the data rate of the serial communication links 115.

Figure 8:
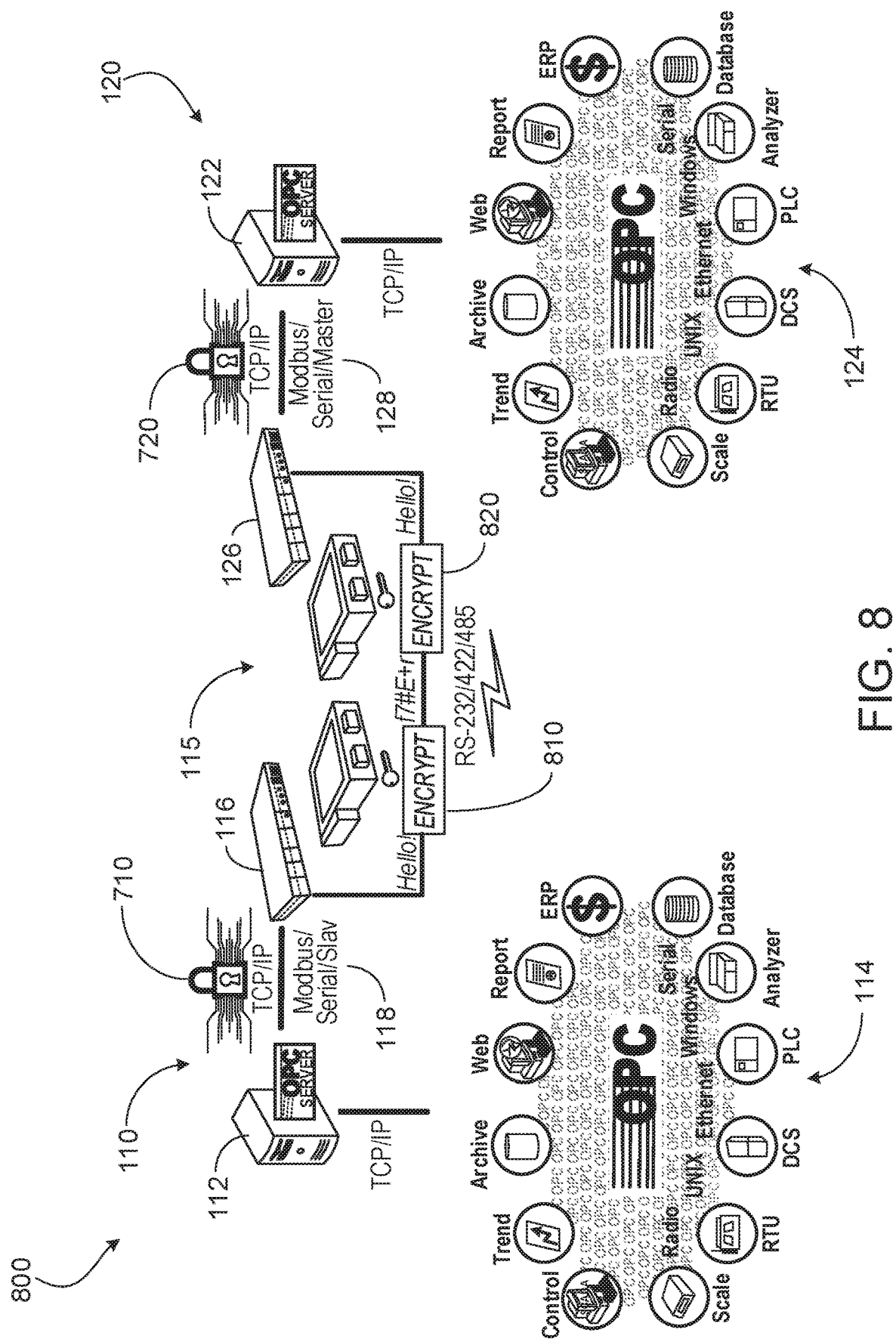
FIG. 8 is a diagram showing an example system for providing secure data transfer between networks with enhanced security between terminal servers of the networks, according to an implementation.

FIG. 8 is a diagram showing an example system 800 for providing secure data transfer between networks with enhanced security between terminal servers of the networks, according to an implementation. Compared to the example system 700 in FIG. 7, the example system 800 includes encrypted secured communication link 115 between the terminal servers 116 and 126. Since the data over the serial link is encrypted, physical security is not required, thus the data can be carried securely through modems over the Public Telephone Network (PTN) or through Virtual Private Network (VPN) over the internet. The encrypted data can be decrypted upon reception at both terminal servers 116 and 126.

In some implementations, more than one serial communication link (for example, the communication link 115) can be used between a source network and a destination network, for example, depending on the amount of data to be exchanged and the data rate of the serial communication links. Another example for the use of more than one serial link is to provide reliability by making one serial link is a redundant link for the other if any of the links failed.

FIG. 9 is a table 900 illustrating example simulation results of the example techniques for providing secure data transfer between networks, according to an implementation. Table 900 illustrates the scale of data that can be exchanged through the data tube. The simulation conducted on several serial connections demonstrates the efficiency of the example techniques. Table 900 demonstrate the amount of data that can be exchanged over serial link with 115 k baud rate, and the proportional relation between the scan frequency and the data bandwidth. For example, at COM04, 10000 mixed data points (integer, real, and digital) exchanged smoothly and reliably between terminal server 116 and 126 at 10 seconds scan frequency controlled by the master computer-implemented system 122 which initiate the requests. At COM08, 1000 similar data mixture exchanged smoothly and reliably between terminal server 116 and 126 at 1 second scan frequency controlled by the master computer-implemented system 122 which initiate the requests. Similarly at COM12 with 4000 data mixture exchanged at 5 seconds scan frequency.

Table 900 also shows the total amount of data that can be exchanged using this technique between the computer-implemented system at the source (unprotected) network 112 and the computer-implemented system at the destination (protected) network 122. 40000 data mixture (integer, real, and digital) exchanged reliability at different frequencies in as small scale using one low-end terminal server (116 and 126) at each end of the networks. The scalability can be easily scaled up to more than 100,000 data points using high-end terminal servers that supports more serial connections. Moreover, multiple terminal servers also can be used at each end of the networks increase the amount of exchanged data between the networks further more to hundreds of thousands.

Figure 10:
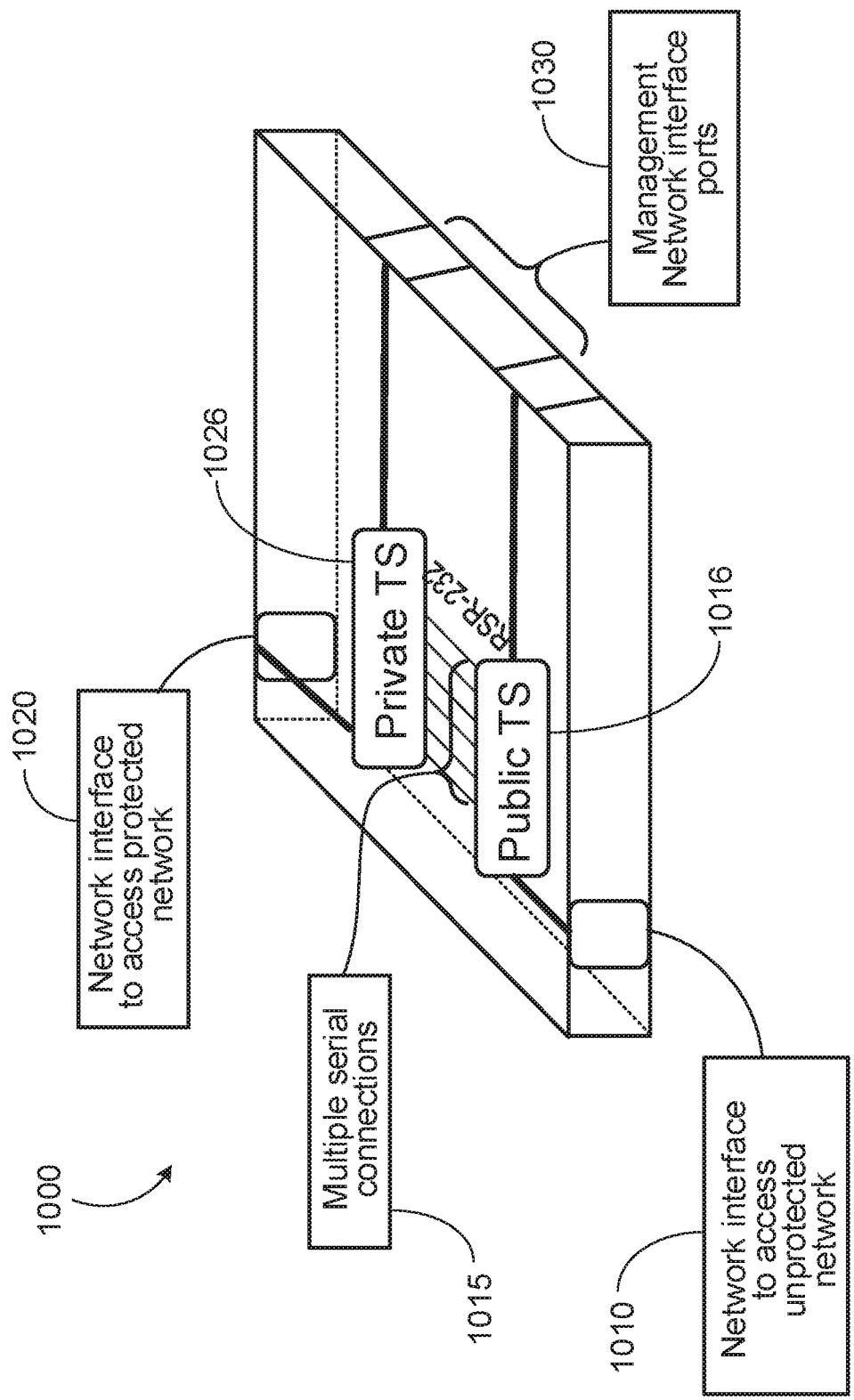
FIG. 10 illustrates a schematic of an example computing system for providing secure data transfer between networks, according to an implementation.

FIG. 10 illustrates a schematic of an example computing system 1000 for providing secure data transfer between networks, according to an implementation. The example computing system 1000 can perform the example operations described with respect to FIGS. 1-9 for providing secure data transfer between networks. The example computing system 1000 can be implemented as an appliance or a device and be an integral component of the example system 100 in FIG. 1. For example, the example computing system 1000 can be implemented as an interface that connects two or more networks for providing secure data transfer between networks.

The example computing system 1000 includes a network interface 1010 to access an unprotected network (for example, the source network 110), a network interface 1020 to access a protected network (for example, the destination network 120), a public terminal server 1016, a private terminal server 1026, one or more serial connections 1015 between the public terminal server 1016 and the private terminal server 1026, and one management network interface port for each terminal server independently 1030.

In some implementations, the network interface 1010 is connected to an OPC/MODBUS gateway (for example, the OPC server 112) of an unprotected network, and the network interface 1020 is connected to an OPC/MODBUS gateway (for example, the OPC server 122) of a protected network. The public terminal server 1016 can be an example of the terminal server 116, and the private terminal server 1026 can be an example of the terminal server 126. The one or more serial connections 1015 can be examples of the serial connections 115, for instance, based on RS-232 connections. The management network interface ports 1030 can be connected to one or more computers for managing the operations of the public terminal server 1016 and the private terminal server 1026, for example, according to the operations described with respect to FIGS. 1-9. In some implementations, the management network interface ports 1030 can be connected to a central computer for providing a centralized control of the example computing system 1000 for providing secure data transfer between networks.

Figure 11:
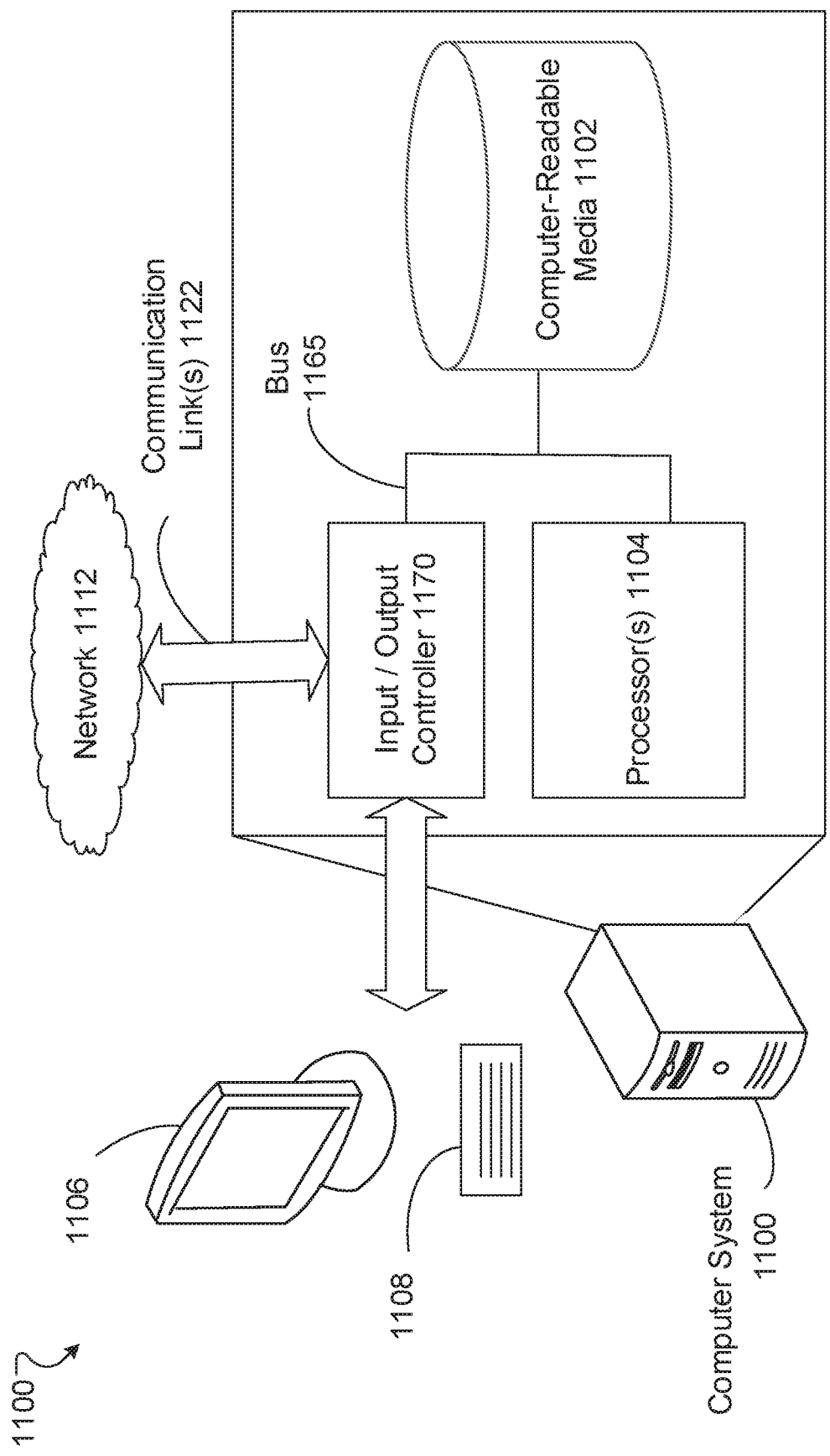
FIG. 11 is a block diagram of an exemplary computer used in an example computing system, according to an implementation.

FIG. 11 is a block diagram of an exemplary computer 1100 used in an example computing system (for example, the computing system 100 or 1000), according to an implementation. The computer 1100 can function as the OPC/MODBUS gateway (for example, the OPC server 112, 122, 612, or 622), a terminal server (for example, the terminal server 116, 126, 616, or 626), a computer-implemented system executing a plant-level application, a business-level application, or a combination of plant-level and business-level applications. The computer 1100 can be connected to one or more of the network interfaces 1010, 1020, or 1030 in FIG. 10. The computer 1100 or any of its components can be located apart from the other components shown in FIG. 11. For example, the computer 1100 can be located in a source network (for example, source network 110), a destination network (for example, destination network 120), a plant network (for example, plant network 610), a business network (for example, business network 620), a data processing center, a computing facility, a laboratory, a company, or another suitable location. The computer 1100 can include additional or different features, and the features of the computer-implemented system can be arranged as shown in FIG. 11 or in another configuration.

The example computer 1100 includes one or more processors 1104, a computer-readable medium 1102 (for example, a memory), and input/output controllers 1170 communicably coupled by a bus 1165.

The processors 1104 can include, for example, one or more cores or other data processing components or apparatus. The processors 1104 can perform the example operations described with respect to FIGS. 1-10. For example, the processors 1104 can provide secure data transfer between networks according to the example method 600 described with respect to FIG. 6.

The computer-readable media 1102 can include, for example, a random access memory (RAM), a read-only memory (ROM), and a data storage device (for example, a magnetic hard disk, floppy disk, or an optical disc). The computer 1100 can be programmed (including pre-programmed or re-programmed) by loading a program from another source (for example, from a CD-ROM or from another computer device through a data network).

The input/output controller 1170 is interoperably coupled to input/output devices (for example, the display device 1106, input devices 1108 (for example, a keyboard, mouse, or stylus), or other input/output devices), and to a network 1112. The input/output devices receive and transmit data in analog or digital form over communication link(s) 1122, such as a serial link, wireless link (for example, infrared or radio frequency), parallel link, or other type of link.

The network 1112 can include any type of data communication network. For example, the network 1112 can include a wireless network, a wired network, a Local Area Network (LAN), a Wide Area Network (WAN), a private network, a public network (such as the Internet), a WIFI network, a network that includes a satellite link, or other type of data communication network.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer-implemented system comprising a computer memory interoperably coupled with a hardware processor configured to perform the computer-implemented method or the instructions stored on the non-transitory, computer-readable medium.

What is claimed is:

1. A computer-implemented method, comprising:
receiving, by a destination terminal server in a destination network, a data frame transmitted over a serial link between the destination terminal server and a source terminal server of a source network, the data frame compatible with a data link layer protocol, and the data frame including a data field that comprises information that includes executable code;
routing, by the destination terminal server, the received data frame to a destination open platform communications (OPC) server coupled to the destination terminal server via a Transmission Control Protocol/Internet Protocol (TCP/IP) connection;
converting, by the destination OPC server, the data frame directly into a format compatible with an application layer protocol, wherein converting the data frame into the format comprises de-capsulation of the information included in the data field and interpreting the information as numerical values rather than executable code; and
outputting, by the destination OPC server, the numerical values to an application in the destination network.

2. The computer-implemented method of claim 1, further comprising:
transmitting, by the destination terminal and via the serial link, a data request to the source terminal server, wherein the data frame is received only in response to the data request.

3. The computer-implemented method of claim 1, wherein the destination network comprises a plant network and the source network comprises a business network.

4. The computer-implemented method of claim 1, wherein the serial link between the destination network and the source network is physically secured or encrypted.

5. The computer-implemented method of claim 1, further comprising:
receiving, by the destination terminal server, multiple data frames transmitted over the serial link between the destination network and the source network; and converting, by the destination OPC server, each of the multiple data frames independently and directly into a format compatible with the application layer protocol.

6. The computer-implemented method of claim 1, wherein outputting the numerical values to an application in the destination network comprises outputting the numerical values to an application in the destination network based on an OPC protocol.

7. A computer-implemented system, comprising:
a source network comprising a source open platform communications (OPC) server and a source terminal server, the source OPC server coupled to the source terminal server via a source Transmission Control Protocol/Internet Protocol (TCP/IP) connection;
a destination network comprising a destination OPC server and a destination terminal server, the destination OPC server coupled to the destination terminal server via a destination Transmission Control Protocol/Internet Protocol (TCP/IP) connection; and
a serial link coupling the destination terminal server and the source terminal server;
one or more processors; and
a non-transitory computer-readable storage medium coupled to the one or more processors and storing programming instructions for execution by the one or more processors, the programming instructions instructing the one or more processors to perform operations including:
transmitting, from the source OPC server and via the source TCP/IP connection, a data frame to the source terminal server, wherein the data frame is compatible with a data link layer protocol, and wherein the data frame includes a data field that comprises information that includes executable code;
transmitting, from the source terminal server and via the serial link, a data frame to the destination terminal server;
transmitting, from the destination terminal server and via the destination TCP/IP connection, the data frame to the destination OPC server;
converting, by the OPC server, the data frame directly into a format compatible with an application layer protocol, wherein converting the data frame into the format comprises de-capsulation of the information included in the data field and interpreting the information as numerical values rather than executable code; and
outputting, by the OPC server, the numerical values to an application in the destination network.

8. The computer-implemented system of claim 7, wherein the destination network comprises a plant network and the source network comprises a business network.

9. The computer-implemented system of claim 7, wherein the serial link between the destination network and the source network is physically secured or encrypted.

10. The computer-implemented system of claim 7, wherein the operations further comprise:
receiving, by the destination terminal server, multiple data frames transmitted over the serial link between the destination network and the source network; and
converting, by the destination OPC server, each of the multiple data frames independently and directly into a format compatible with the application layer protocol.

11. The computer-implemented system of claim 7, wherein outputting, by the OPC server, the numerical values to an application in the destination network comprises:
outputting the numerical values to an application in the destination network based on an OPC protocol.

12. A non-transitory, computer-readable medium storing computer-readable instructions executable by a computer-implemented system in a destination network to perform operations comprising:
receiving a data frame transmitted over a serial link between the destination network and a source network, the data frame compatible with a data link layer protocol, the data frame including a data field that comprises information that includes executable code, wherein the destination network comprises a communications (OPC) server coupled to a terminal server via a Transmission Control Protocol/Internet Protocol (TCP/IP) connection;
converting the data frame directly into a format compatible with an application layer protocol, wherein converting the data frame into the format comprises de-capsulation of the information included in the data field and interpreting the information as numerical values rather than executable code; and
outputting the numerical values to an application in the destination network.

13. The non-transitory, computer-readable medium of claim 12, the operations further comprising:
transmitting a data request to the source network, wherein the data frame is received only in response to the data request.

14. The non-transitory, computer-readable medium of claim 12, wherein the destination network comprises a plant network and the source network comprises a business network.

15. The non-transitory, computer-readable medium of claim 12, wherein the serial link between the destination network and the source network is physically secured or encrypted.

16. The non-transitory, computer-readable medium of claim 12, the operations further comprising:
receiving multiple data frames transmitted over the serial link between the destination network and the source network; and
converting each of the multiple data frames independently and directly into a format compatible with the application layer protocol.

17. The non-transitory, computer-readable medium of claim 12, wherein outputting the numerical values to an application in the destination network comprises outputting the numerical values to an application in the destination network based on an open platform communications (OPC) protocol.

* * * * *